(12) United States Patent
Furneaux

(10) Patent No.: US 7,195,113 B2
(45) Date of Patent: Mar. 27, 2007

(54) COIN STORE MEASUREMENT

(75) Inventor: David Furneaux, Reading (GB)

(73) Assignee: Mei, Inc., West Chester, PA (US)

( * ) Notice: Subject to any disclaimer, the term of this patent is extended or adjusted under 35 U.S.C. 154(b) by 539 days.

(21) Appl. No.: 10/690,765

(22) Filed: Oct. 22, 2003

(65) Prior Publication Data

US 2004/0079615 A1   Apr. 29, 2004

(30) Foreign Application Priority Data

Oct. 24, 2002   (EP)   ................................... 02257410

(51) Int. Cl.
G06M 9/00 (2006.01)
G07F 9/08 (2006.01)

(52) U.S. Cl. .................... 194/215; 453/16; 73/290 V; 73/627

(58) Field of Classification Search ................ 194/215, 194/216, 217, 218; 73/1.82, 1.86, 631; 367/100; 453/16, 17, 58, 61

See application file for complete search history.

(56) References Cited

U.S. PATENT DOCUMENTS

| | | | |
|---|---|---|---|
| 3,901,367 A | 8/1975 | Miyazawa | |
| 4,012,588 A | 3/1977 | Davis et al. | |
| 4,223,790 A | 9/1980 | Yoshida | |
| 4,345,650 A | 8/1982 | Wesley | |
| 4,590,975 A | 5/1986 | Credle, Jr. | |
| 4,596,144 A * | 6/1986 | Panton et al. | 73/620 |
| 4,774,841 A | 10/1988 | Chadwick | |
| 5,092,816 A | 3/1992 | Levasseur | |
| 5,492,212 A | 2/1996 | Fillod et al. | |
| 5,505,090 A * | 4/1996 | Webster | 73/657 |
| 5,616,865 A | 4/1997 | Webster | |
| 5,708,223 A | 1/1998 | Wyss | |
| 5,742,656 A | 4/1998 | Mikulak et al. | |
| 5,755,618 A | 5/1998 | Mothwurf | |
| 5,821,424 A * | 10/1998 | Rodriguez | 73/657 |
| 5,929,337 A | 7/1999 | Collins et al. | |
| 6,227,058 B1 | 5/2001 | Tretiakov | |
| 6,234,023 B1 | 5/2001 | Collins et al. | |
| 6,318,537 B1 | 11/2001 | Jones et al. | |
| 6,497,085 B2 * | 12/2002 | Fukumoto et al. | 53/501 |
| 2003/0051970 A1 | 3/2003 | Furneaux et al. | |
| 2004/0079615 A1 | 4/2004 | Furneaux | |

FOREIGN PATENT DOCUMENTS

| | | |
|---|---|---|
| GB | 2139 352 A | 11/1984 |
| GB | 2190 749 A | 11/1987 |
| WO | WO 97/35279 A1 | 9/1997 |
| WO | WO 01/48704 A2 | 7/2001 |
| WO | WO 01/48704 A3 | 7/2001 |

* cited by examiner

Primary Examiner—Patrick Mackey
Assistant Examiner—Mark J. Beauchaine
(74) Attorney, Agent, or Firm—Fish & Richardson P.C.

(57) ABSTRACT

A method of measuring a characteristic of a container in a coin handling apparatus which involves generating a data set from an acoustic pulse reflected by the container and analyzing the data set. The analysis includes comparing the data set to one or more stored data sets. This is used to determine the height of a coin stack in a coin tube and/or to identify the coin tube.

19 Claims, 4 Drawing Sheets

COIN STORE MEASUREMENT

This invention relates to coin handling apparatus and vending machines which may incorporate coin validators.

GB-A-2190749 discloses the measurement of an acoustic signal to determine the level of a stack of coins in a coin tube. The arrangement described includes a source which emits acoustic pulses which are directed towards the top of the stack. A sensor is arranged to detect pulses reflected by the top of the stack. The time between the emitted and the received signals is measured and this is used to calculate the height of the stack from which the number of coins in the stack is derived.

GB-A-2357617 (the contents of which are incorporated herein by reference) discloses the use of an electric spark as a source of acoustic pulses, the reflection of which is then measured to derive the number of coins in a store. A number of such measurements may be made from which an average is calculated.

It is an object of the invention to increase the accuracy of such measurements. When such measurements are made, a number of factors contribute to the measured pulse. These include reflection by the topmost coin, which is desired, but also includes a number of extraneous factors such as reflection of the pulse by the walls of the tube and the manifold supporting the tube relative to the source. Additionally, the change in cross-sectional area between the manifold and the tube cause reflections of the pulse which can significantly distort the measured signal. By discounting contributions to the measurement attributable to these phenomena, the accuracy of the measurement can be increased.

According to a first aspect of the invention a method of determining a characteristic of a coin handling apparatus includes the steps of generating a pressure wave, measuring reflection of the pressure wave by the apparatus, comparing the measurement to a reference and determining the characteristic on the basis of the comparison.

The characteristic may be the number of coins stored in a coin store.

Independent aspects of the invention relate to reconfigurable coin validators, in which means are provided to recognise the type of a component (such as a coin tube) fitted thereto.

According to a further aspect of the invention a method of identifying a component of a coin handling apparatus is provided which includes the steps of generating a pressure wave, measuring reflection of the pressure wave by the component, comparing the measurement to a reference or to each of a set of references, and making the identification on the basis of the comparison.

The component may be a coin tube or a set of coin tubes. Where the method applies to a set of coin tubes, a comparison may be made between measurement data generated in respect of each tube and corresponding stored reference data characteristic of respective types of tube.

According to a further aspect of the invention, coin handling apparatus is provided which includes means for identifying the type of a container by taking a measurement of the container (preferably but not necessarily using a pressure wave) and comparing this with sets of reference data, each associated with a different container type, and means for detecting the status of the container by comparing measurement data with a corresponding set of reference data.

The status of the container may be an indication of how full the container is and may, in particular, relate to the number of items stored by the container.

Aspects of the invention are set out in the accompanying claims.

Arrangements embodying the invention will now be described by way of example with reference to the accompanying drawings, in which.

Figure 1:
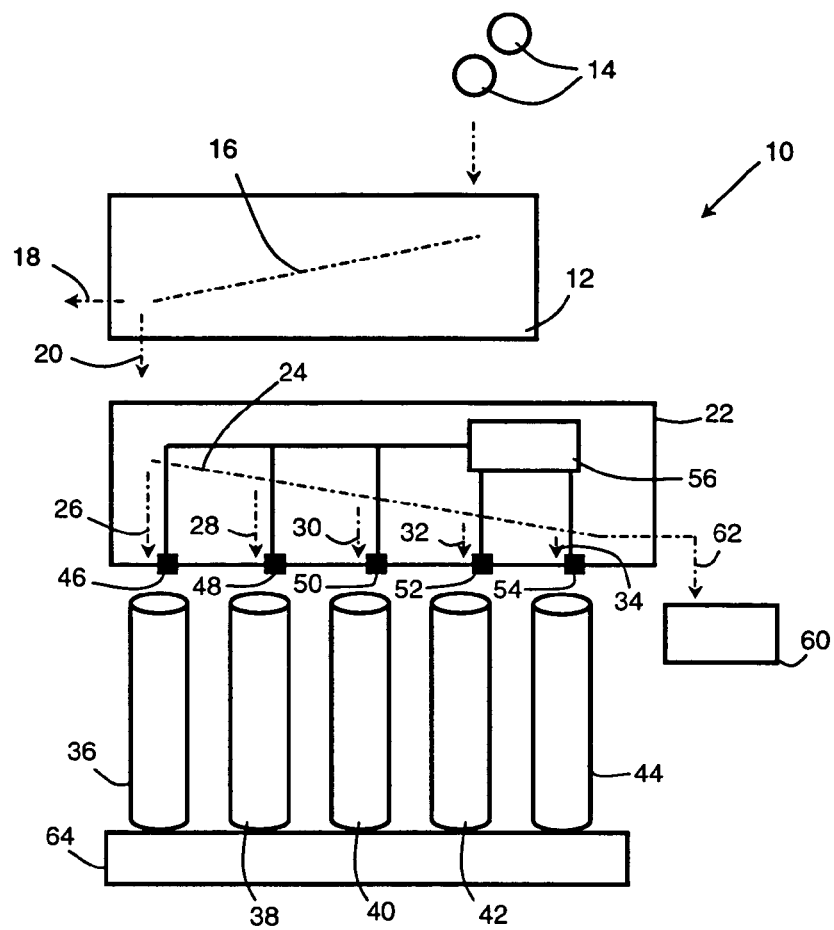
FIG. 1 is a schematic illustration of a coin handling apparatus according to an embodiment of the invention.

Referring to FIG. 1, a coin handling apparatus 10 includes a coin validator 12. Coins 14 are inserted into the validator 12 and travel along a path 16 during which the validity and denomination of the coins are determined. If the coins 14 are deemed invalid, they are rejected and are expelled from the validator 12 along path 18. If deemed valid, the coins are directed along path 20 to a coin separator 22.

The coin follows a path 24 within the coin separator 22 and passes a number of gates (not shown) which operate to direct the coin to one of a number of coin tubes in dependence on the denomination of the coin. Coin paths 26, 28, 30, 32 and 34 correspond to coin tubes 36, 38, 40, 42 and 44. Respective coin tubes 36, 38, 40, 42 and 44 include sensor arrays 46, 48, 50, 52 and 54 which are connected to a signal processor 56. The coin may also be directed to a cashbox 60 along a path 62 if the corresponding coin tube is full, for example.

A coin dispenser 64 is connected to the coin tubes and dispenses coins when required to make change.

Figure 2:
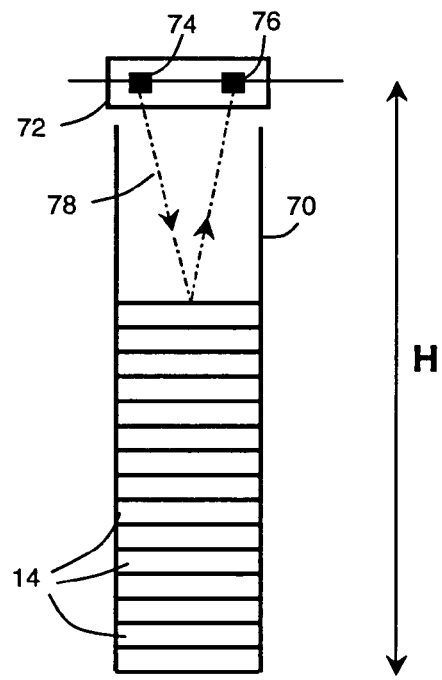
FIG. 2 is a schematic representation of a coin tube and sensor array arrangement of the apparatus of FIG. 1.

FIG. 2 illustrates a coin tube 70 corresponding to any one of the coin tubes 36, 38, 40, 42 and 44 of FIG. 1 which has a plurality of coins 14 stored therein. A sensor array 72 (corresponding to sensor arrays 46, 48, 50, 52 and 54) includes an acoustic pulse generator in the form of a spark gap 74 and a microphone 76. The microphone 76 is arranged at a height H above the base of the coin tube 70.

Figure 3:
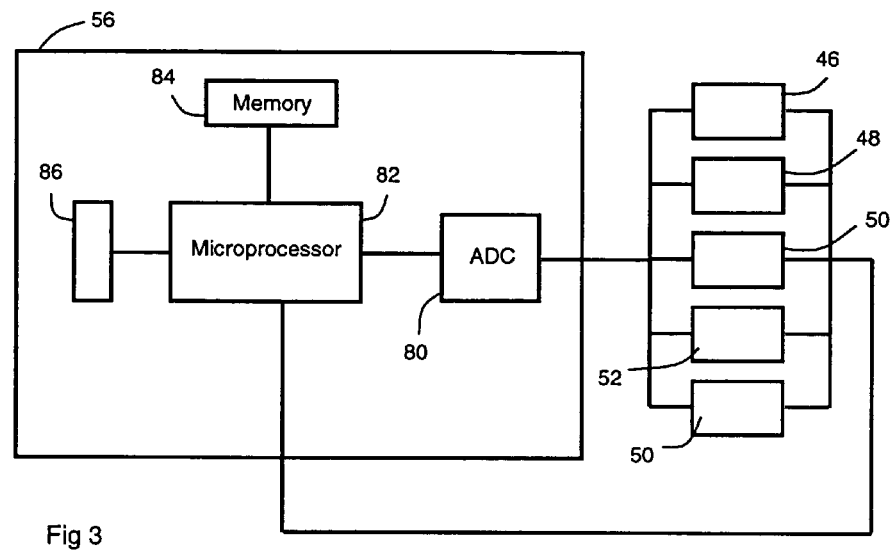
FIG. 3 is a schematic illustration of a signal processor of the coin handling apparatus of FIG. 1.

FIG. 3 is a schematic depiction of the signal processor 56 which includes an Analogue-to-Digital converter (ADC) 80 connected to respective sensor arrays 46, 48, 50, 52 and 54. The ADC 80 is also connected to a microprocessor 82 which has a memory 84. The sensor arrays 46, 48, 50, 52 and 54 are also connected to the microprocessor 82 as is a thermometer 86.

In the description which follows, the elements of the coin tube and sensor arrays illustrated in FIG. 2 shall be used for ease of reference. It is to be realised however that this description applies equally to any of the corresponding components illustrated in FIGS. 1 and 3.

The microprocessor 82 which is connected to the sensor array 72 causes the spark gap 74 to discharge. This causes an acoustic pulse to travel in the direction of path 78. As the pulse strikes the topmost coin in the stack and other surfaces, it is reflected back towards the microphone 76 which, in response to the reflected pulse, generates a signal. The signal produced by microphone 76 is converted to digital form by the ADC 80 and the output of the ADC is sampled by the microprocessor 82 (FIG. 3) at specified intervals to produce a plurality of data points which are stored in memory 84. In this embodiment this interval is 5.06 µs.

Figure 4:
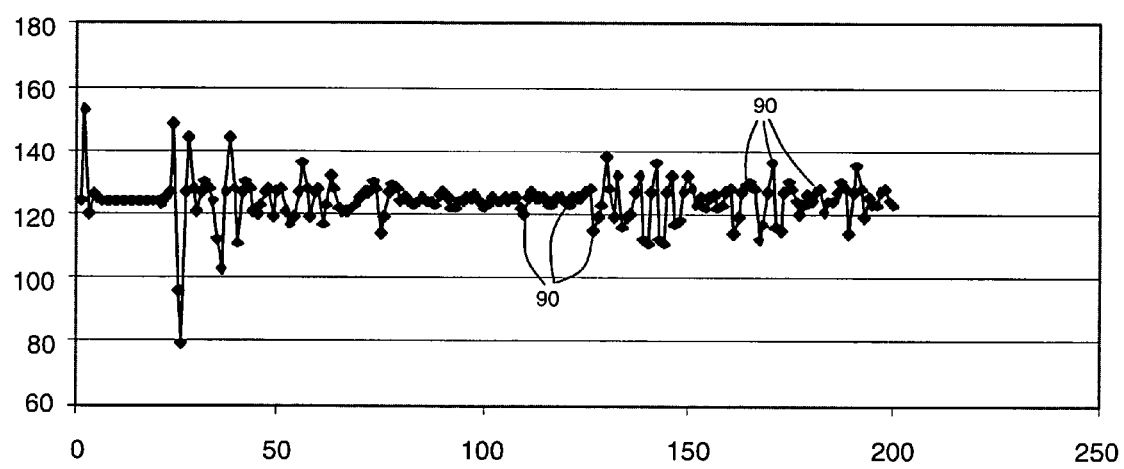
FIG. 4 is a representation of the data points recorded by the apparatus of FIGS. 1 to 3.

FIG. 4 shows data points 90 which are derived in the manner described above.

A first measurement technique will now be described with reference to FIGS. 5 to 7.

Figure 5:
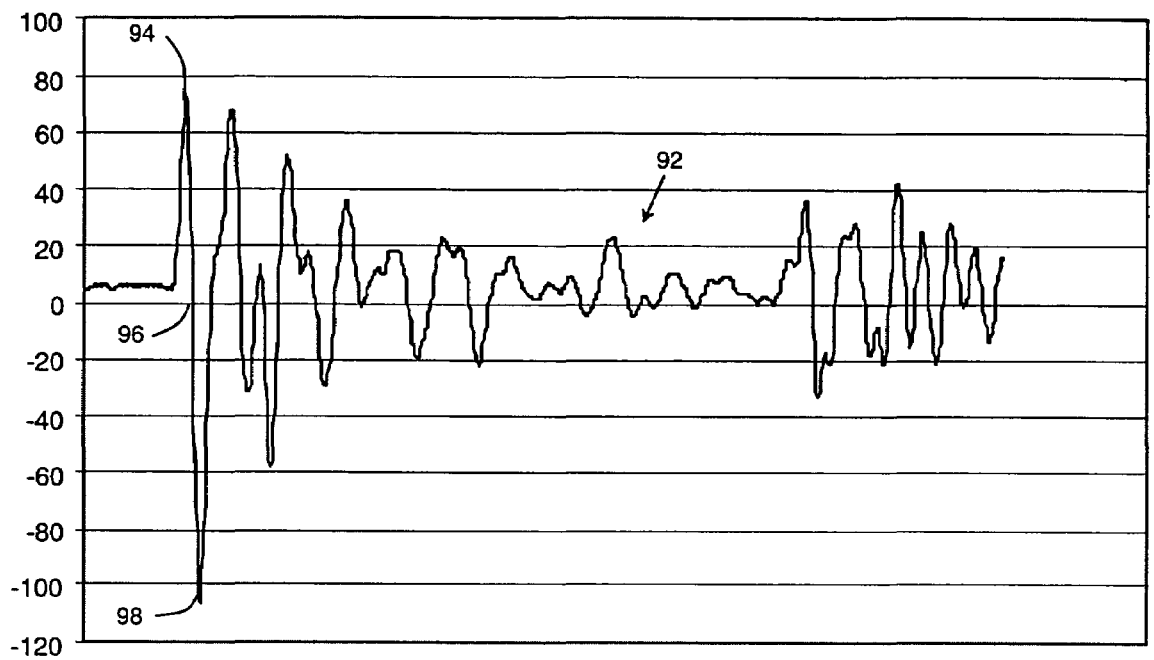
FIG. 5 is an illustration of a sample signal produced by the apparatus of FIGS. 1 to 3.

FIG. 5 illustrates a typical sample waveform 92 derived from the data points 90. The sample waveform 92 is based not only on the points 90 but additional points which are reconstructed by the use of a reconstruction algorithm used to increase the resolution of the waveform. The manner in which the waveform is derived from the stored data and any associated interpolation is well known in the art of signal reconstruction and will not be further described herein.

To accurately determine the height of the coin stack in the coin tube 70 it is necessary to ascertain which part of the waveform 92 is attributable to reflection of the acoustic pulses from the topmost coin.

In a preliminary calibration operation, when the coin tube 70 is empty of all coins, the spark gap 74 is fired and data points which can be reconstructed to form a reference waveform 100 (FIG. 6) are derived. The data points corresponding to this reference waveform are stored in the memory 84 for later recall. As this reference waveform corresponds to an empty tube, a comparison with the sample waveform 92 which is subsequently produced in a measurement operation will highlight those portions of the sample waveform which are attributable to reflection of the acoustic pulses from the topmost coin of the stack.

Calibration of other tubes 70, which would have different dimensions, is carried out in a similar manner.

Coin handling-apparatus of the type illustrated in FIGS. 1 to 3 are mass-produced. If they are produced with sufficiently small tolerance levels then the data points derived for the tubes during the calibration of an apparatus may be used for other apparatuses of the same type. However, if the tolerances are insufficiently small, the calibration will have to be carried out on each apparatus. It may further be necessary to calibrate once the coin handling apparatus has been transported and installed in the location where it is to be used. This avoids influences on measurements from changes in the alignment of the mechanism resulting from transport or installation and differences in ambient conditions such as humidity.

The process of comparison of the sample and reference waveforms will now be described with reference to FIGS. 5, 6 and 7 where like numerals are used to designate like features.

It has been found that the first positive peaks 94 of both the sample and reference waveforms are attributable to portions of the coin handling apparatus 10 other than the coin tube 70. Therefore all points occurring before reference point 96 (the point at which either waveform first traverses the baseline after the peak 94) are ignored in the comparison.

First, the amplitude of the sample waveform is normalised so that a reliable comparison can be made. The first negative peak 98 of the sample waveform is taken as a reference and an appropriate factor is applied to the sample waveform so that the amplitude of this peak 98 is equal to the first negative peak 102 of the reference waveform 100.

Once the sample waveform has been normalised to account for differences in amplitudes, the waveform has to be further normalised to compensate for temperature variations. As the speed of sound varies in accordance with changes in temperature of the medium through which the sound is propagated, differences in ambient temperatures when the reference waveform 100 and the sample waveform 80 were produced will manifest as a scaling of the waveform along the x-axis (time axis). To compensate for this a scaling factor is applied to the sample waveform according to the following equation:

$$T_c = \sqrt{\frac{T}{293° K}} \quad (1)$$

In equation (1), $T_C$ is the temperature coefficient and represents the factor applied to the waveform. T is the absolute temperature at which the particular measurement is made. A similar scaling factor, corresponding to the temperature at which the reference waveform was derived, is applied to the reference waveform prior to its storage in the memory 84.

The temperature corresponding to the sample waveform is ascertained from the thermometer 86 (FIG. 3) which is attached to the microprocessor 82.

Once the waveform has been normalised to compensate for differences in temperature and amplitude, the difference between the sample waveform and the reference waveform is calculated by subtracting the value of each point on the reference waveform from the value of the corresponding point on the sample waveform.

Although the sample waveform has been scaled in the manner described to compensate for temperature differences, it has been found that even a slight difference in scale along the x-axis between the reference and sample waveforms results in a significant error when calculating the difference. To minimise this error and to ensure that corresponding points on the reference and sample waveforms are used in the calculation of the difference, each point on the sample waveform is compared to the five points on the reference waveform closest in time to that point. The point on the reference waveform for which-the difference is the least is then used to derive the points of the difference waveform by subtracting the value of the chosen point on the reference waveform from the value of the corresponding point on the sample waveform.

Figure 6:
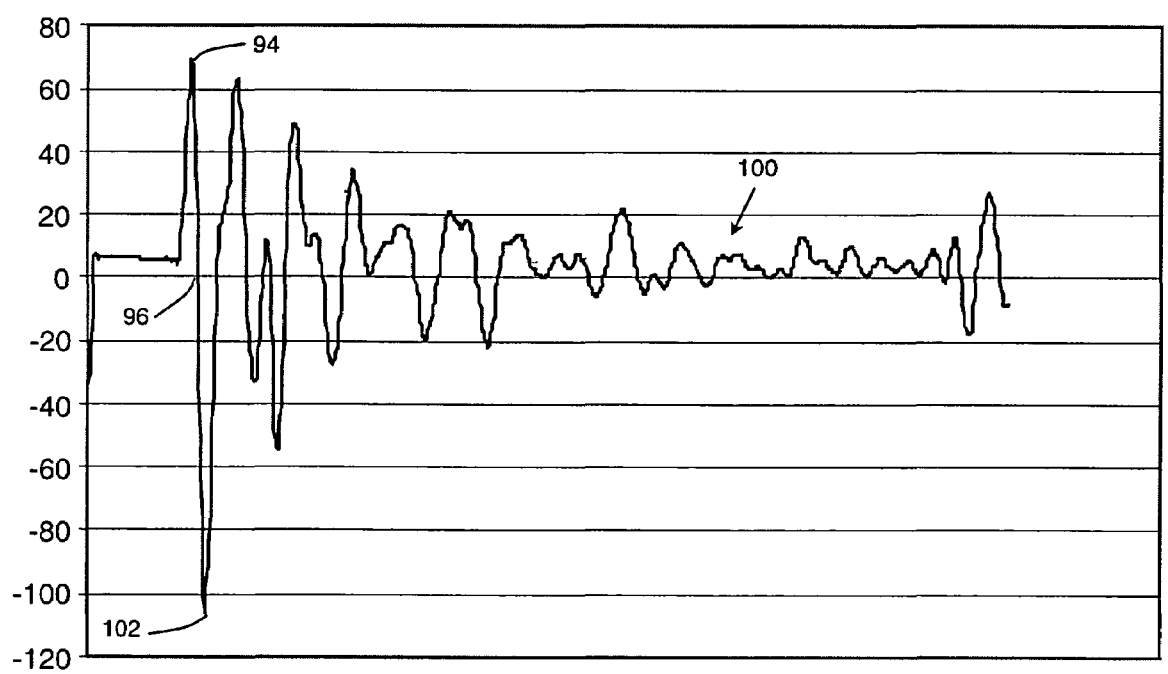
FIG. 6 is an illustration of a reference signal produced by the apparatus of FIGS. 1 to 3.
Figure 7:
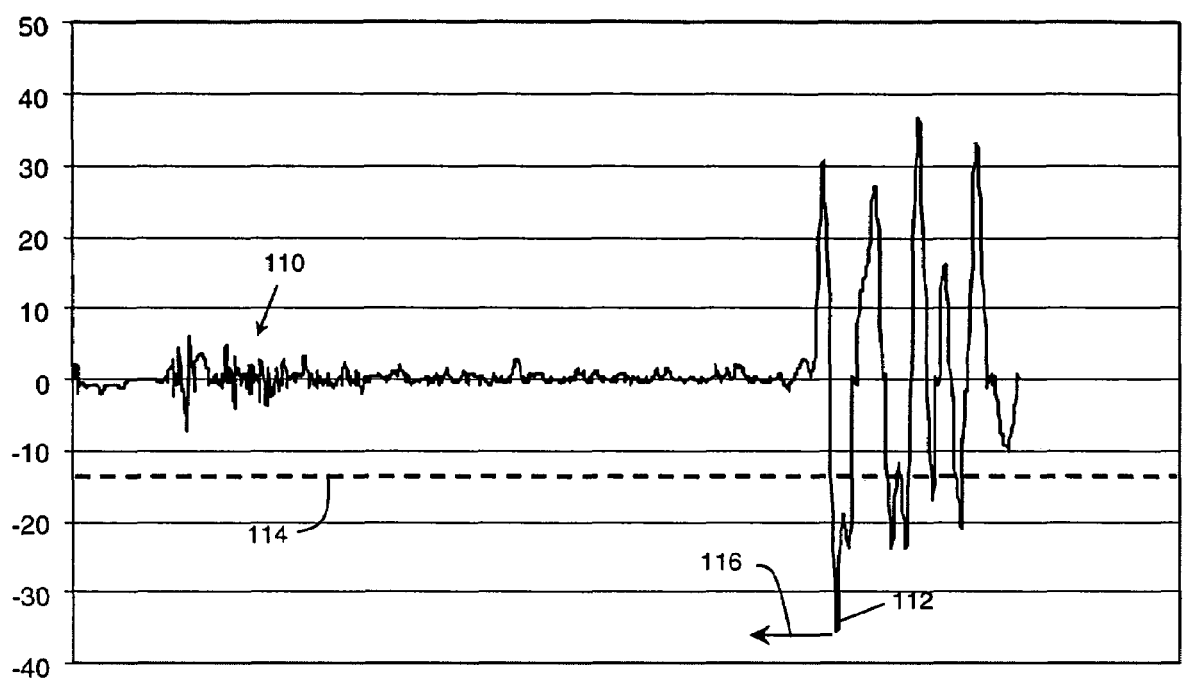
FIG. 7 is an illustration of a difference signal produced by the apparatus of FIGS. 1 to 3 and derived from the signals of FIGS. 5 and 6.

FIG. 7 illustrates a difference waveform 110 produced in this manner from the waveforms of FIGS. 5 and 6. To calculate the height of the coin stack, the greatest negative peak 112 on the difference waveform 110 is identified. A threshold 114 is set at 40% of the amplitude of the peak 112 and the difference waveform is scanned in the direction of arrow 116 for a distance corresponding to 200 µs. The first negative peak encountered which exceeds the threshold 114 is taken to be that portion of the waveform produced by reflection of the acoustic pulse from the topmost coin in the stack. If no such peak is encountered then the largest negative peak 112 is used in the calculation. It is to be realised however that the quantities 40% and 200 µs quoted above are peculiar to the described embodiment and it is anticipated that these amounts may be varied to adapt to varying conditions.

The height of the stack may then be calculated according to the following formula:

$$S = H - \frac{Vt}{2} \quad (2)$$

In equation (2), S is the stack height, H is the height of the microphone 76 above the base of the coin tube 70 (FIG. 2)

and t is the time after spark initiation of the peak corresponding to the topmost coin. V is the speed of sound at 293° K which is 331.29 m/s.

The height, H, is measured using the apparatus which involves producing a sample waveform for the tube which contains a single coin and calculating H' according to equation (3):

$$H' = \frac{Vt'}{2} \quad (3)$$

V is as previously defined and t' is the time of the identified peak of the sample waveform produced for a single coin.

Once H' has been calculated, H is derived from H' by subtracting the known thickness of a single coin.

The empty coin tube is not used to calculate H' because the semi-open nature of the bottom of the tube can cause phase changes resulting in a timing error, which could translate into a significant error in the result.

When the height of a coin stack with relatively few coins is to be calculated, the sample waveform is used as the difference waveform to calculate H because the reference and sample waveforms are too similar for a reliable comparison between the two to be made. In this embodiment, this technique is used when there are five or fewer coins in the stack.

The height of the coin stack may also be determined by a second measurement technique.

A first sample waveform of the type illustrated in FIG. 5 is generated in the manner described above. When the microprocessor detects that a coin has been received by or dispensed from the corresponding coin tube 70, a second sample waveform, also of the type illustrated in FIG. 5, is generated in the same manner as the first sample waveform.

The sample waveform corresponding to the lower coin stack height is then subtracted from the sample waveform corresponding to the higher coin stack height. Whether the first is subtracted from the second or the second from the first will thus depend on whether a dispense or receive operation has been performed.

The resultant difference waveform will have a peak corresponding to the higher of the two coin stacks measured. The height of this stack is then calculated in the manner described above with reference to equations (2) and (3).

In the second technique, normalisation of-amplitude and/or the axis may be applied to either or both waveforms prior to subtraction. However, in the preferred embodiment, no time axis normalisation (i.e. temperature compensation) is carried out. If there is a significant time delay after generation of the first sample waveform before the second waveform is derived, then the first measurement is discarded and the process is restarted. This ensures that no significant temperature difference exists between the first sample waveform and the second waveform and that therefore it is not necessary to normalise either waveform to compensate for temperature differences. However, as no temperature compensation has been applied to the sample waveforms, V (the speed of sound) in these equations is adjusted according to the temperature at which the measurements are made when deducing the stack height. This temperature is ascertained from the thermometer 86. A good approximation for V at a particular temperature is given by equation (4).

$$V_T \approx \sqrt{(401)}T \quad (4)$$

Here T is the absolute temperature (in degrees Kelvin) at which the measurement was made and $V_T$ is the velocity in meters per second.

In the preferred embodiment, both the first and second measurement techniques are used in order to verify that the measurements are correct.

Thus, the first and the second sample waveforms are each analysed using the first measurement technique and the respective coin stack heights compared to verify that they differ by a single coin. Then, the height of the coin stack ascertained by the second measurement technique is checked to see that it agrees with the measurement derived using the first technique. There are therefore two checks to verify that the current measurement is correct.

Although any number of measurements are possible, the time taken to make a measurement may render continual measurement of the coin stack impractical as it could interfere with the operation of the microprocessor 82 which is involved in a number of processes other than coin stack height calculation. Therefore, the measurement of the height of the coin stack is performed when the apparatus 10 is switched on, and the process repeated until the current measurement is verified. Thereafter, a running tally of the number of coins in the stack is maintained by subtracting or adding the number of coins received and dispensed from the number of coins calculated from the measurement. If desired, the system could be arranged to prevent the level of coins in the stack from going above and/or below respective limits until a verification has been achieved, to prevent incorrect operation;

Coins vary in thickness which results in errors when determining the number of coins in a stack from the height of the stack. Such errors are cumulative and may therefore be particularly pronounced in a large coin stack. For this reason, measurement of the stack recommences if the running tally determines that the stack has dropped below a predetermined threshold, until verification is again achieved. In this embodiment this threshold is ten coins.

It has also been found that the reference waveform 100 is characteristic of the coin tube. By storing a number of reference waveforms, the microprocessor 82 can distinguish between different coin tubes. This is particularly useful when, as in the embodiment of FIG. 1, the coin validator is configured so that different coin tubes may be attached to the validator to accommodate different combinations of denominations or different currencies.

When a new coin tube is attached to the validator, a sample waveform corresponding to the empty coin tube is produced and compared to a plurality of stored reference waveforms, each corresponding to a different coin tube. The sample waveform is normalised and compensation for temperature differences are applied in the manner previously described. Then, by subtracting the sample waveform from each stored reference waveform and noting the reference waveform resulting in the smallest difference, the correct coin tube can be identified.

In a further embodiment, the coin tubes form a set and coin tubes are changed by substituting one set for another. A particular set may then be recognised by following the procedure outlined above for each tube of the set. The sample waveform for each tube in the set is compared against the stored reference waveforms. By combining the results for the individual tubes, the set can be recognised. When dealing with sets of coin tubes, misidentification or non-identification of one of the tubes may be compensated for when the results of the entire set are combined.

Recognising coin tubes and coin tube sets in this manner avoids the need to program the microprocessor with elaborate recognition routines (such as recognising a machine readable code) or altering a relevant setting manually when the coin tube or coin tube set is changed.

In the above arrangement, the time axis of the sample waveform is adjusted using a temperature sensor to match that of the reference waveform. Obviously, the reference waveform axis could instead or additionally be adjusted. Instead of normalising the reference waveform prior to storage, based on the temperature at which it was produced, the waveform could be produced when the apparatus is in a controlled environment at a particular temperature. A further alternative is to store the temperature at which the reference waveform is produced, so that only a single time-axis normalisation procedure (based on the difference between this temperature and that at which the sample waveform is derived) is needed.

Also, instead of using a temperature sensor for time-axis normalisation of a pair of waveforms, other techniques could be used to match the time axes. For example, the waveforms can be analysed using a feature matching procedure to normalise the waveforms. Such feature matching is well known in the art of signal analysis and comparison and will not be further described herein. Alternatively, the waveforms could be correlated to determine the relative scaling of the time axes.

Amplitude normalisation may also be applied to either or both of the waveforms being compared, and, when one of these is the reference waveform, this may be amplitude-normalised prior to storage.

The method and associated apparatus described may find application wherever reflected pressure waves are measured. For example, GB-A-2357617 discloses the use of measuring the time between transmission and reflection of an acoustic pulse to determine the configuration of a coin validator (for example, whether a coin store is present), to detect the dimension of a coin store, to detect the presence of a jammed coin or to detect the amount of product in a vending machine. The current method and apparatus may be used to achieve greater accuracy of any of these measurements.

The invention claimed is:

1. A method of determining the number of coins in a coin store comprising generating an acoustic pulse, generating a first waveform based on reflections of the pulse by the store, comparing the first waveform to a second waveform and calculating the number on the basis of the comparison.

2. A method according to claim 1 wherein the second waveform is a reference waveform derived in a calibration operation.

3. A method according to claim 1, wherein the second waveform is derived from reflections of an acoustic pulse when a different number of coins is in said coin store.

4. A method according to claim 3 which includes generating the first waveform before, and generating the second waveform after, the coin store has performed one of a coin dispense or a coin receive operation.

5. A method according to claim 4 which includes disregarding the first waveform and generating a further waveform if the coin store has not performed said operation within a predetermined interval.

6. A method according to claim 1 wherein the comparison includes identifying a portion of the first or the second waveform attributable to reflection of the pulse by a topmost coin in the coin store.

7. A method according to claim 1 wherein the number is indicative of the height of a stack of coins.

8. A method according to claim 1 including scaling either or both of the waveforms on a normative time axis prior to the comparison.

9. A method according to claim 8, wherein the scaling is based on a measured temperature at which the first waveform is generated.

10. A method according to claim 8 which includes matching at least one feature of the first waveform to a corresponding feature of the second waveform and scaling either or both of the waveforms with reference to the feature.

11. A method according to claim 8, wherein the first and second waveforms are correlated to determine a scaling factor.

12. A method according to claim 1 which includes normalizing the amplitude of either or both of the first and the second waveforms prior to the comparison.

13. A method according to claim 1 wherein the comparison is a subtraction of one of the first or second waveforms from the other of the waveforms.

14. A method of identifying a coin store comprising generating a sample waveform by detecting acoustic pulses reflected by the coin store and comparing the sample waveform to a plurality of reference waveforms each corresponding to a known coin store.

15. A method according to claim 14 which includes generating the reference waveforms and storing them during calibration.

16. A method according to claim 14 wherein the pulse is generated by a spark.

17. A coin handling apparatus comprising a coin store having at least one coin container selected from among coin containers of a plurality of types for storing respective different coin denominations, means for storing sets of reference data, each set corresponding to a respective coin store type, means for identifying a coin store type by deriving measurement data from the coin store and comparing it with a plurality of sets of reference data and means for measuring the level of coins in the container by deriving measurement data and comparing it with reference data applicable to that container.

18. A coin handling apparatus according to claim 17 wherein the coin store includes a plurality of containers and the identification means derives measurement data from each container.

19. A coin handling apparatus according to claim 17 which includes a thermometer.

* * * * *